(12) United States Patent
Stojanovski et al.

(10) Patent No.: US 9,088,957 B2
(45) Date of Patent: Jul. 21, 2015

(54) PROVISIONING OF VOICE AND OTHER CS-DOMAIN SERVICES

(71) Applicant: LG ELECTRONICS INC., Seoul (KR)

(72) Inventors: Saso Stojanovski, Paris (FR); Arnaud Vedrine, Paris (FR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 13/945,433

(22) Filed: Jul. 18, 2013

(65) Prior Publication Data

US 2013/0303141 A1 Nov. 14, 2013

Related U.S. Application Data

(63) Continuation of application No. 12/907,486, filed on Oct. 19, 2010, now Pat. No. 8,515,485.

(60) Provisional application No. 61/253,078, filed on Oct. 20, 2009.

(51) Int. Cl.
| | |
|---|---|
| H04M 1/00 | (2006.01) |
| H04W 68/00 | (2009.01) |
| H04W 36/00 | (2009.01) |
| H04M 3/06 | (2006.01) |
| H04M 3/42 | (2006.01) |
| H04W 4/16 | (2009.01) |

(52) U.S. Cl.
CPC ........ *H04W 68/005* (2013.01); *H04W 36/0022* (2013.01); *H04M 3/06* (2013.01); *H04M 3/42017* (2013.01); *H04M 2201/14* (2013.01); *H04W 4/16* (2013.01); *H04W 68/00* (2013.01)

(58) Field of Classification Search
CPC .................................................. H04W 68/005
USPC ........................... 455/406, 422, 550; 370/225
See application file for complete search history.

(56) References Cited

U.S. PATENT DOCUMENTS

2009/0036130 A1 2/2009 Diachina et al.
2009/0238143 A1 9/2009 Mukherjee et al.
(Continued)

FOREIGN PATENT DOCUMENTS

CN 101222765 A 7/2008
WO 2008/088258 7/2008

OTHER PUBLICATIONS

International Search Report from corresponding PCT/KR2010/007199.
(Continued)

*Primary Examiner* — Hsin-Chun Liao
(74) *Attorney, Agent, or Firm* — Morgan, Lewis & Bockius LLP

(57) ABSTRACT

Disclosed are devices and methods for provisioning of voice and other CS-domain services. A first server (22) comprises a call reception block (221) configured to receive an incoming voice call, from a first user equipment; a transmitting block (222) configured to send, in response to the reception of the incoming voice call, a paging request to a second server; a service request reception block (223) configured to receive, from the second server, an SGs service request message, and; a trigger block (224) configured to use the SGs service request message as a trigger to send an indication of user alerting to the first user equipment when the SGs service request message indicates that a second user equipment was in Connected mode.

10 Claims, 3 Drawing Sheets

(56) References Cited

U.S. PATENT DOCUMENTS

2010/0080171 A1 4/2010 Rune et al.
2010/0302937 A1 12/2010 Hu et al.

OTHER PUBLICATIONS

European Search Report dated Jun. 27, 2014, issued by the European Patent Office Office in European Patent Application No. 10825194.3.

3GPP TS 23.272 V8.5.0, "3rd Generation Partnership Project; Technical Specification Group Services and System Aspects; Circuit Switched Fallback in Evolved Packet System; Stage 2 (Release 8)," XP-002616841, Sep. 2009, p. 1-53.

Office Action dated Feb. 24, 2014, issued by the State Intellectual Property Office of China in Chinese Patent Application No. 201080043211.3.

3GPP TS 23.272 V8.0.0, "3rd Generation Partnership Project; Technical Specification Group Service and System Aspects; Circuit Switched Fallback in Evolved Packet System; Stage 2 (Release 8)," 2008.

PROVISIONING OF VOICE AND OTHER CS-DOMAIN SERVICES

CROSS-REFERENCE

The present application is a continuation of U.S. patent application Ser. No. 12/907,486, filed on Oct. 19, 2010, which claims priority benefit to U.S. Provisional Application No. 61/253,078, filed on Oct. 20, 2009, both of which are incorporated herein by reference in their entireties for all purposes.

TECHNICAL FIELD

The present invention generally relates to devices and methods for provisioning of voice and other CS-domain services.

BACKGROUND

As described in the specification 3GPP TS 23.272, the Circuit Switched domain Fallback feature (CSFB) in the Evolved Packet System (EPS) allows for provisioning of voice and other CS-domain services (e.g. SMS) by reuse of the CS infrastructure when the user equipment (UE) is served by Evolved UMTS Terrestrial Radio Access Network (E-UTRAN).

Specifically for the case of Mobile Terminated (MT) voice calls, the CSFB feature allows to page the mobile for CS domain MT calls while the mobile camps in Idle mode on E-UTRAN cell or while the mobile is connected to the EPC/E-UTRAN.

In both cases the mobile is eventually redirected to the legacy GERAN/UTRAN (GSM EDGE Radio Access Network/UMTS Terrestrial Radio Access Network) access over which the CS domain call is eventually established.

In the pre-CS fallback terminating call establishment cases, the call management signalling defined in the 3GPP 24.008 Technical Specification triggers state transitions in the network, as the call establishment progresses. In particular, once a proper radio channel has been allocated to the called UE, the called UE may generate an ALERTING message, which indicates the called user is being alerted, and triggers the network to generate a ring-back tone towards the calling party.

However, in CS Fallback context, when the called user was in idle mode on the E-UTRAN side, if the network waits for the generation by the called UE of the ALERTING message (which can only be sent after the CS Fallback procedure has taken place), the calling user will have to wait for a very long time before being informed about the fact that the network connected with the called user.

In CS Fallback context, when the called user was in connected mode on the E-UTRAN side, the called user was already alerted of the MT call and requested to accept/refuse the incoming call while it was still attached to E-UTRAN.

If the called UE sent an ALERTING message to the network after getting to UTRAN/GERAN, a ring-back tone would be generated towards the calling UE but that would mean the called user would need to accept the call a second time or to wait for some additional time for the call to be established (if waiting for some time for the calling user to hear a ringback tone before connecting the users). If the called UE sent a CALL CONFIRMED message directly followed by a CONNECT message without previous ALERTING message, the calling user will not have heard a ring-back tone before hearing the called user.

Overall this will result in poor user experience.

Embodiments of the present invention will improve the situation. In particular, embodiments of the invention aim at improving the user experience of the calling party in the case of CS domain Fallback with mobile terminated calls.

SUMMARY

To address these needs, an aspect of the present invention relates to a first server comprising:
a call reception block configured to receive an incoming voice call, from a first user equipment,
a transmitting block configured to send, in response to the reception of the incoming voice call, a paging request to a second server,
a service request reception block configured to receive, from the second server, an SGs service request message, and
a trigger block configured to use the SGs service request message as a trigger to send an indication of user alerting to the first user equipment when the SGs service request message indicates that a second user equipment was in Connected mode.

The server according to the invention thus aims at improving the user experience of the calling party by allowing the calling party to know that the network is in the process of alerting the user on the called party side.

In some embodiments, the trigger block is further configured to, when the second user equipment was in Idle mode, use the SGs service request message as a trigger to inform the calling party that the call is progressing.

The server may further comprise a timer block configured to, when the second user equipment was in Connected mode, use the connected mode indication to start a Call Forwarding on No Reply timer.

Another aspect of the present invention relates to a method for mobile terminating call comprising the steps of:
receiving in a first server an incoming voice call, from a first user equipment, for a second user equipment,
transmitting from the first server, in response to the reception of the incoming voice call, a paging request to a second server,
receiving in the first server a SGs service request message from the second server, and
using in the first server the SGs service request message as a trigger to send an indication of user alerting to the first user equipment when the SGs service request message indicates that a second user equipment was in Connected mode.

BRIEF DESCRIPTION OF THE DRAWINGS

The present invention is illustrated by way of example, and not by way of limitation, in the figures of the accompanying drawings, in which same reference numerals refer to similar elements and in which.

DESCRIPTION OF PREFERRED EMBODIMENTS

Figure 1:
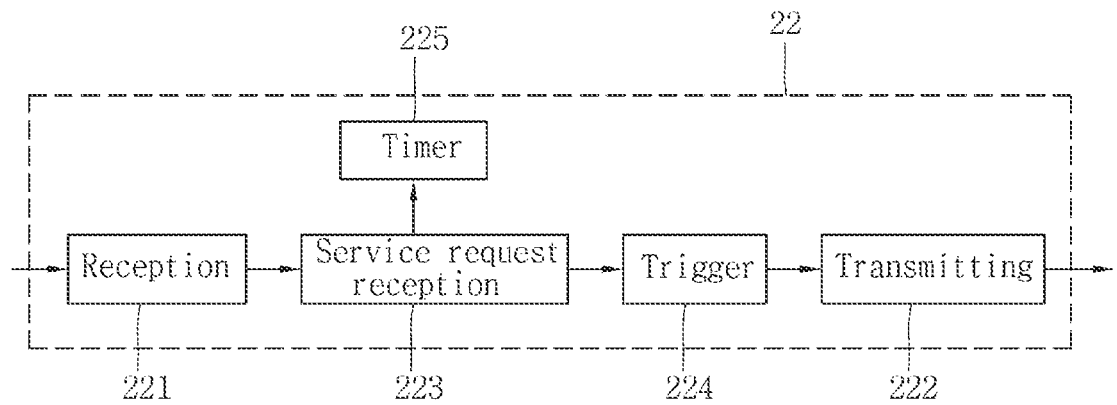
FIG. 1 is a schematic block diagram of a Mobile Switching Centre server.
Figure 2:
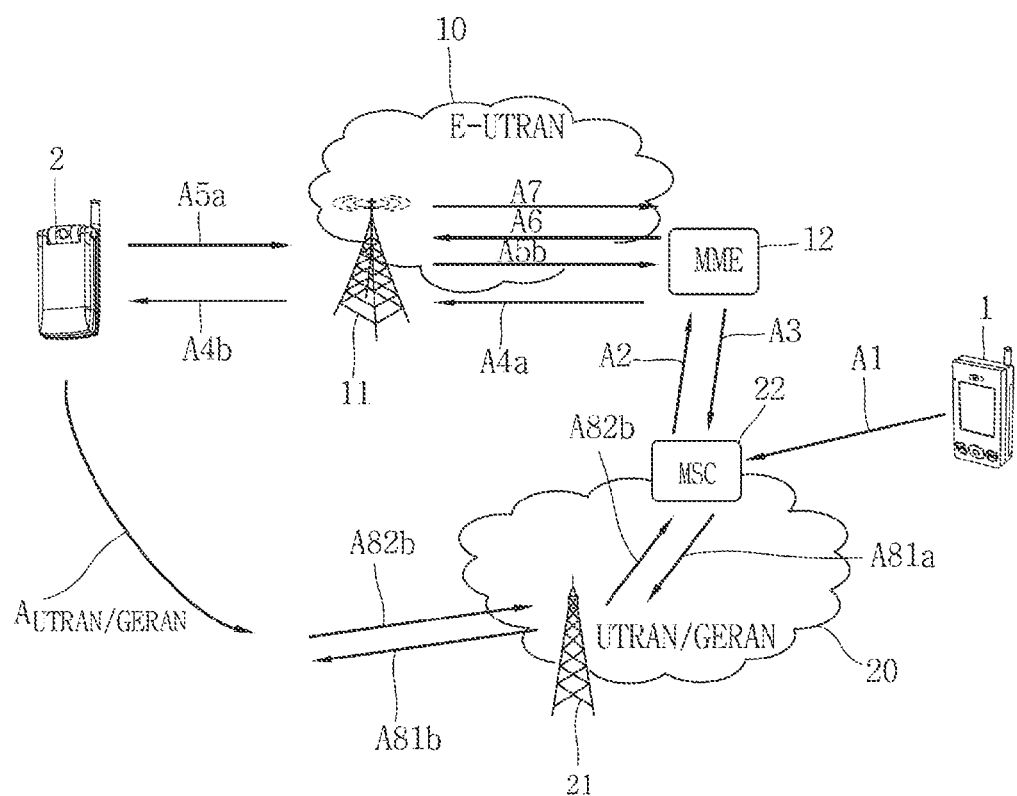
FIGS. 2 and 3 are schematic diagrams showing a network comprising the Mobile Switching Centre server of FIG. 1 and steps of a method for establishing a call between a first user equipment and a second user equipment of the network, according to a first embodiment of the invention.

Referring to FIG. 1 a Mobile Switching Centre (MSC) server 22 according to an embodiment of the invention comprises a call reception block 221 configured to receive an incoming voice call, for example from a first User Equipment (UE) 1 (FIG. 2).

The MSC server 22 comprises a transmitting block 222 configured to send, in response to the reception of an incoming voice call, a Paging Request to a Mobile Management Entity (MME) server 12 (FIG. 2).

The MSC server 22 comprises a service request reception block 223 configured to receive, from the MME server 12, a SGs service request message. The SGs service request message is described in specification 3GPP TS 23.272. The SGs Service Request message contains an indication that a called UE was in Connected mode or in Idle mode.

The MSC server 22 further comprises a trigger block 224 configured to use the SGs service request message as a trigger to send an indication of user alerting to the first UE 1 when the SGs service request message indicates that a second User Equipment (UE) 2, which is the addressee of the call, was in Connected mode. In some embodiments of the invention, the trigger block 224 is further configured to use the SGs service request message as a trigger to inform the calling party that the call is progressing when the second UE 2 was in Idle mode.

The MSC server 22 further comprises a timer block 225 configured to use the connected mode indication of the SGs service request message to start a Call Forwarding on No Reply timer when the second UE 2 was in Connected Mode.

FIG. 2 shows a telecommunication network comprising an E-UTRAN network 10, a UTRAN/GERAN network 20, the first UE 1 and the second UE 2. The E-UTRAN network 10 comprises an e-node B 11 and the MME server 12. The UTRAN/GERAN network 20 comprises a RNC/BSC 21 and the MSC server 22.

Figure 3:
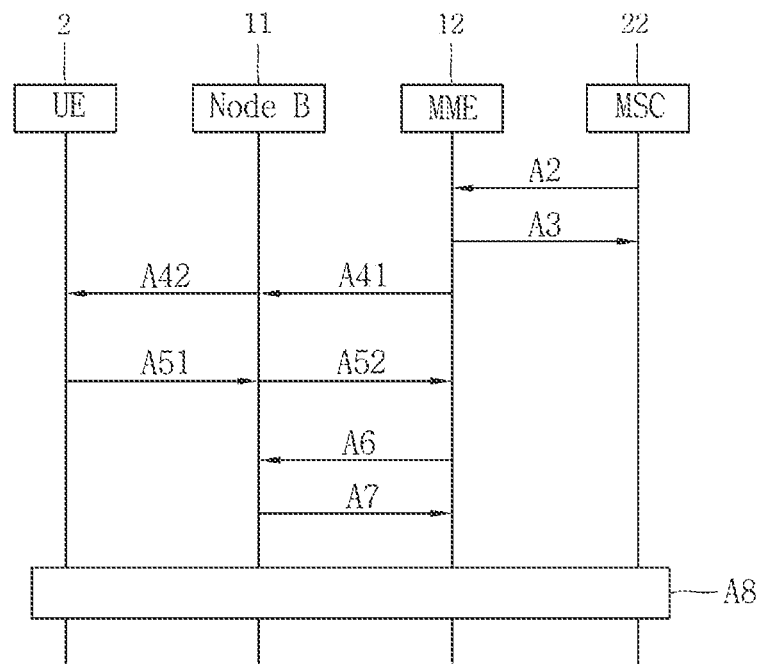

Referring to FIGS. 2 and 3 we are describing a method for establishing a call according to an embodiment of the invention, in which the second UE 2 is in Connected mode, or Active mode.

We consider that the user of the first UE 1 wants to call the user of the second UE 2.

The MSC 22 receives an incoming voice call from the first UE 1, as symbolized by arrow A1 in FIG. 2. The MSC 22 responds by sending a Paging Request to the MME 12, as symbolized by arrow A2.

The MME 12 receives the Paging Request from the MSC 22 and responds by sending a SGs Service Request message to the MSC 22, as symbolized by arrow A3. In this embodiment, as the second UE 2 is in Connected mode, the SGs Service Request message is sent right after the reception of the Paging Request and indicates to the MSC 22 that a signalling connection exists for the second UE 2. In other words, the SGs Service Request message contains an indication that the second UE 2 was in Connected mode.

The effect of the SGs Service Request message is that the MSC 22 considers the paging procedure as successful and stops a supervision timer for it.

Furthermore, upon reception of the SGs Service Request message, the MSC 22 initiates the generation of ring-back tone towards the UE 1 of the calling party, for example by sending an ISUP Address Complete Message towards a G-MSC. ISUP is part of the Signalling System which is used to set up telephone calls in Public Switched Telephone Networks. It is specified by the ITU-T.

Thus, the MSC 22 is able to initiate the generation of ring-back tone without awaiting reception of a potential ALERTING message.

In the Connected mode, the MME 12 has an established connection with the e-node B 11 and reuses the existing connection to relay the Paging Request to the second UE 2, as symbolized by arrow A4a. The e-node B 11 receives the Paging Request from the MME 12 and sends it to the second UE 2, as symbolized by arrow A4b. The Paging Request sent to the second UE 2 contains a CN Domain indicator and a Caller Line Identification.

In response to the Paging Request, the second UE 2 needs to accept or reject the call. We consider here that the call is accepted. Then, the second UE 2 sends an Extended Service Request message to the MME 12, as symbolized by arrow A5a. The node 11 receives the Extended Service Request message from the second UE 2 and forwards it to the MME 12, as symbolized by arrow A5b. The Extended Service Request message contains a CS Fallback Indicator indicating to the MME 12 to perform CS Fallback, as described in specification 3GPP TS 23.272.

In response to the reception of the Extended Service Request message, the MME 12 sends to the e-node B 11 an AP UE Context Modification Request message that includes a CS Fallback Indicator, as symbolized by arrow A6. This message indicates to the node 11 that the second UE 2 has to be moved to UTRAN/GERAN network 20. The node 11 responds by sending to the MME 12 a AP UE Context Modification Response message, as symbolized by arrow A7.

The second UE 2 is then moved to UTRAN/GERAN network 20, as symbolized by arrow $A_{UTRAN/GERAN}$, and a CS Call Establishment procedure is performed, as symbolized by arrow A8 in FIG. 2. A CS call establishment procedure for MT calls is described in 3GPP TS 24.008 specification.

During this procedure, the MSC 22 sends a SETUP message to the second UE 2, as symbolized by arrow A81a in FIG. 1. The RNC/BSC 21 receives the SETUP message from the MSC 22 (embedded in a RANAP message) and forwards it to the second UE 2, as symbolized by arrow A81b.

The second UE 2 responds by sending to the MSC 22 a CALL CONFIRMED message, as symbolized by arrow A82a. This message is a confirmation that the SETUP message was well received. The node 21 receives the CALL CONFIRMED message from the second UE 2 and forwards it to the MSC 22, as symbolized by arrow A82b.

Immediately after the previous step, the second UE 2 sends a CONNECT message indicating that the communication can start.

Figure 4:
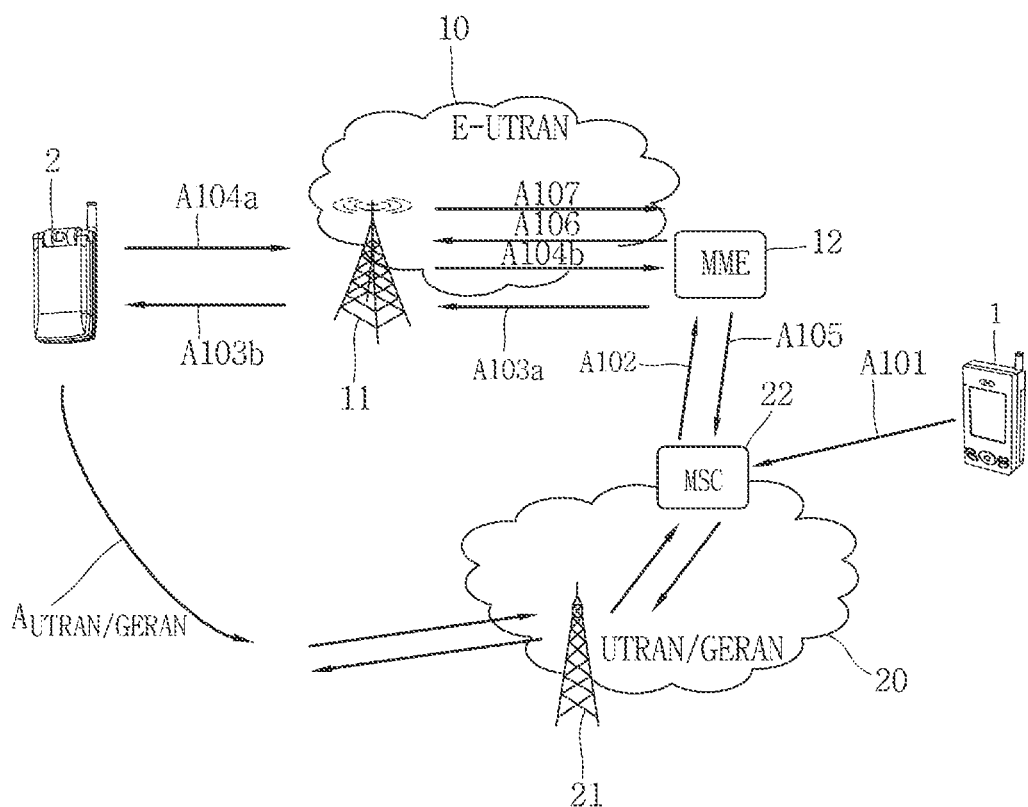
FIGS. 4 and 5 are schematic diagrams showing a network comprising the Mobile Switching Centre server of FIG. 1 and steps of a method for establishing a call between a first user equipment and a second user equipment of the network, according to a second embodiment of the invention.
Figure 5:
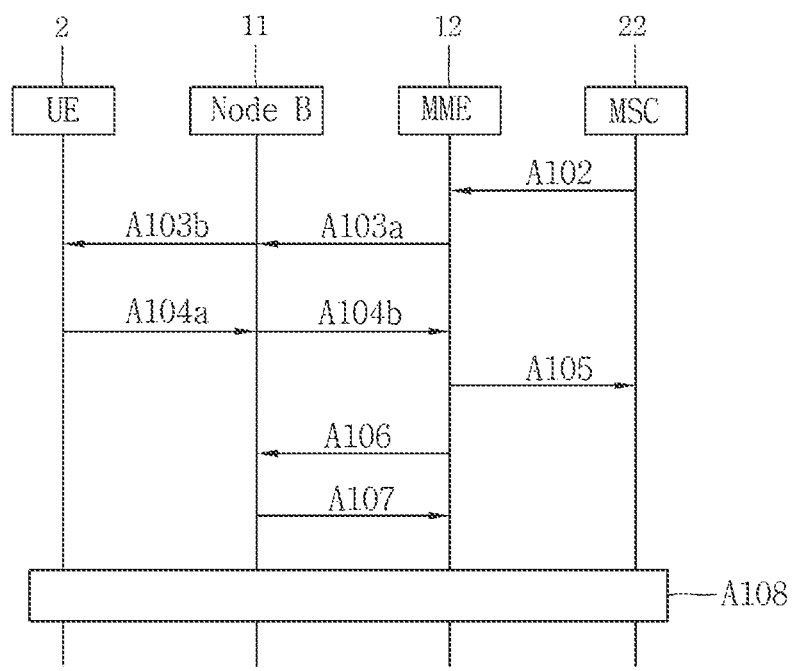

FIG. 4 shows a telecommunication network similar to the telecommunication network of FIG. 2. However, in the embodiment represented in FIGS. 4 and 5, we consider that the second UE 2 is in Idle mode.

The MSC 22 receives an incoming voice call from the first UE 1, as symbolized by arrow A101 in FIG. 4. The MSC 22 responds by sending a Paging Request to the MME 12, as symbolized by arrow A102.

The MME 12 receives the Paging Request from the MSC 22. Given that the UE 2 is in idle mode, the MME 12 needs to page the UE 2 in order to bring it to Connected mode.

Thus, the MME 12 responds to the Paging Request from the MSC 22 by sending a Paging Request intended to the second UE 2 and indicating that the page comes from the CS domain, as symbolized by arrow A103a. The e-node B 11 receives the Paging Request from the MME 12 and forwards it to the second UE 2, as symbolized by arrow A103b.

The second UE 2 responds by sending to the MME 12 an Extended Service Request message containing a CS Fallback Indicator, as symbolized by arrow A104a. This message triggers the CS fallback procedure towards the legacy GERAN/UTRAN access. The node B 11 receives the Extended Service Request message from the second UE 2 and forwards it to the MME 12, as symbolized by arrow A104b.

After the reception of the Extended Service Request message by the MME 12, a SGs Service Request is sent from the MME 12 to the MSC 22, as symbolized by arrow A105, to indicate to the MSC 22 that a signalling connection exists for this UE 2.

As previously described, this message causes the MSC 22 to stop a supervision timer for the paging procedure. Furthermore, upon reception of the SGs Service Request message, the MSC 22 initiates the generation of ring-back tone towards the calling party, for example by sending an ISUP Address Complete Message towards the G-MSC. Thus, the MSC 22 is able to initiate the generation of ring-back tone without awaiting reception of a potential ALERTING message.

Subsequently, the MME 12 sends to the e-node B 11 an S1-AP Initial UE Context setup message that includes a CS Fallback Indicator, as symbolized by arrow A106. This message indicates to the e-node B 11 that the second UE 2 has to be moved to UTRAN/GERAN network 20. The e-node B 11 responds by sending to the MME 12 an S1-AP Initial UE Context Setup Response message, as symbolized by arrow A107.

The second UE 2 is then steered to GERAN/UTRAN network, as symbolized by arrow $A_{UTRAN/GERAN}$. Depending on the UE 2 capabilities and on the target access network capabilities, several options exist for the way the second UE 2 is steered to UTRAN/GERAN. It can be done through a PS handover, through a network assisted cell change, or through an RRC connection Release with redirection.

Then a CS Call Establishment procedure is performed, as symbolized by arrow A108. This procedure is similar to the procedure described in reference to FIGS. 2 and 3.

Thus, in both cases (Connected mode and Idle mode) the method according to the invention allows the calling party to know that the network is in the process of alerting the user on the called party side.

Contrary to a ring-back tone used to inform a calling party that the phone of the called user is ringing, the present invention permits to initiate the generation of ring-back tone towards the calling party as soon as the network gets in touch with the called mobile phone, i.e. as soon as the network gets a response from it, even if the called mobile phone is not necessarily ringing at this point.

It makes also use of the SGs signalling between the MME and the MSC to trigger state transition of the Connection Management state machine of the MSC, while before this invention, only Connection Management messages triggered such transitions.

While there has been illustrated and described what are presently considered to be preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. A server, comprising:
a call reception block configured to receive a signal for an incoming voice call;
a transmitting block configured to send, in response to the reception of the incoming voice call, a paging request to a network entity;
a service request reception block configured to receive, from the network entity, a service request message including an indicator informing that a second user equipment (UE) was in an idle mode; and
a trigger block configured to use the service request message as a trigger to inform a first UE that a call is progressing.

2. The server of claim 1, wherein the network entity is a Mobility Management Entity (MME).

3. The server of claim 1, further comprising a timer block configured to, when the second user equipment was in Connected mode, use the connected mode indication to start a Call Forwarding on No Reply timer.

4. The server of claim 1, wherein the service request message allows the server to stop retransmitting the paging request message.

5. The server of claim 1, wherein the paging request message and the service request message are exchanged via a SG interface between the server and the network entity.

6. The server of claim 1, wherein if the server receives the service request message, the server generates a ring-back tone without awaiting a reception of an ALERTING message.

7. The server of claim 1, wherein the server is a Mobile Switching Center.

8. A method for receiving a mobile terminating call, the method performed by a user equipment (UE) and comprising:
receiving, by the UE in an idle mode and from an eNodeB, a paging message including a first indicator informing that a circuit switching (CS) domain initiates the paging;
performing, by the UE, a procedure for establishing an RRC connection; and
transmitting, from the UE and to a Mobile Management Entity (MME) via the eNodeB, a service request message for falling back to a CS domain, such that the service request message is used as a trigger to inform a calling party that a call is progressing.

9. The method of claim 8, further comprising performing, by the UE, a handover procedure.

10. The method of claim 8, wherein the service request message is encapsulated in at least one of a RRC message and an S1-AP message.

* * * * *